US006986006B2

(12) United States Patent
Willman et al.

(10) Patent No.: US 6,986,006 B2
(45) Date of Patent: Jan. 10, 2006

(54) PAGE GRANULAR CURTAINED MEMORY VIA MAPPING CONTROL

(75) Inventors: Bryan Mark Willman, Kirkland, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 10/124,609

(22) Filed: Apr. 17, 2002

(65) Prior Publication Data

US 2003/0200405 A1 Oct. 23, 2003

(51) Int. Cl.
G06F 12/14 (2006.01)
(52) U.S. Cl. ..................................... 711/152; 711/163
(58) Field of Classification Search ................ 711/202, 711/206, 163, 152
See application file for complete search history.

(56) References Cited

U.S. PATENT DOCUMENTS

| 4,584,639 | A | * | 4/1986 | Hardy .......................... 713/200 |
| 4,926,322 | A | * | 5/1990 | Stimac et al. .................. 703/23 |
| 5,822,784 | A | * | 10/1998 | Garney ........................ 711/208 |
| 5,892,900 | A | | 4/1999 | Ginter et al. ................ 395/186 |
| 5,978,892 | A | * | 11/1999 | Noel et al. ................... 711/170 |
| 6,061,773 | A | * | 5/2000 | Harvey et al. ............... 711/206 |
| 6,125,430 | A | * | 9/2000 | Noel et al. ................... 711/152 |
| 6,341,345 | B1 | * | 1/2002 | Auslander et al. ........... 712/204 |
| 6,345,351 | B1 | * | 2/2002 | Holmberg .................... 711/203 |
| 6,349,355 | B1 | * | 2/2002 | Draves et al. ................. 711/6 |
| 6,434,685 | B1 | * | 8/2002 | Sexton et al. ................ 711/206 |
| 6,496,912 | B1 | * | 12/2002 | Fields et al. ................. 711/170 |
| 6,622,263 | B1 | * | 9/2003 | Stiffler et al. .................. 714/13 |
| 6,785,886 | B1 | * | 8/2004 | Lim et al. ....................... 718/1 |
| 6,789,156 | B1 | * | 9/2004 | Waldspurger .................. 711/6 |
| 6,842,832 | B1 | * | 1/2005 | Franaszek et al. ........... 711/159 |

OTHER PUBLICATIONS

Bugnion, E. et al., "Disco: Running Commodity Operating Systems on Scalable Multiprocessors", *Proceedings of the 16th Symposium on Operating Systems Principles (SOSP)*, 1997, 1-14.
Coffing, C.L. "An x86 Protected Mode Virtual Machine Monitor for the MIT Exokernel", *Submitted to the Department of Electrical Engineering and Computer Science*, May 21, 1999, 1-109.
Goldberg, R.P. "Survey of Virtual Machine Research", *IEEE Computer*, Jun. 1974, 34-45.
Popek, G.J. et al., "Formal Requirements for Virtualizable Third Generation Architectures", *Communications of the ACM*, Jul. 1974, 17(7), 412-421.
Smith, J.E. "An Overview of Virtual Machine Architectures", Oct. 26, 2001, 1-20.
Waldspurger, C.A. "Memory Resource Management in VMware ESX Server", *Proceedings of the 5th Symposium on Operating Systems Design and Implementation*, Dec. 9-11, 2002, 15 pages.

* cited by examiner

*Primary Examiner*—T Nguyen
(74) *Attorney, Agent, or Firm*—Woodcock Washburn LLP

(57) ABSTRACT

Methods of providing and limiting access to trusted memory are provided. Trusted memory pages are not mapped with page map pages. When a central processor is operated in a page-mapping mode, access to the trusted memory is limited. In particular, without mapping information, software and hardware modules cannot access and modify the contents of trusted memory sections.

5 Claims, 6 Drawing Sheets

PAGE GRANULAR CURTAINED MEMORY VIA MAPPING CONTROL

BACKGROUND OF THE INVENTION

1. Field of the Invention

The present invention relates to the field of electronic data processing. More particularly, the invention provides methods and devices for restricting access to sections of memory modules.

2. Description of Related Art

Modern computer operating systems are configured to allow users to easily install hardware and software. One drawback associated with such open operating systems that allow users to easily install hardware and software is that such operating systems are inherently untrustworthy. For example, operating systems that allow users to change data stored in kernel memory or system files are vulnerable to attacks by computer viruses. Moreover, operating systems that allow the modification of all of the content stored in a computer's memory can be damaged by improperly designed or installed software and hardware components.

Another drawback of open operating systems is that they limit the content that providers are willing to distribute to computer users. In particular, content providers are reluctant to distribute valuable audio, video or other content to computer devices that allow users to easily copy and redistribute the content.

Therefore, there exists a need in the art for operating systems and methods that provide trusted memory sections that are difficult or impossible to modify with computer virus, drivers or other hardware or software components. Moreover there exists a need in the art for operating systems and methods that provide application programs, stored in trusted memory, that limit a user's ability to copy and redistribute content.

BRIEF SUMMARY OF THE INVENTION

The present invention overcomes one or more of the limitations of the prior art by providing methods, systems and computer-executable components for controlling access to memory by controlling values that appear in page map pages. A computer operating system may be configured to operate in a page-mapping mode with trusted memory sections not mapped by page map pages. Without mapping information, software and hardware modules cannot access and modify the contents of trusted memory sections. Page map pages may be configured to be read-only. An attempt to edit a read-only page may be intercepted and filtered with a PTE edit module. The PTE-edit module allows modifications that maintain the trusted memory section. The PTE edit module also ensures that the page tables themselves are only mapped read-only, so that the PTE-module is invoked when the operating system or an adversary attempts to modify the mappings.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Aspects of the present invention may be implemented with computer devices that have trusted memory sections implemented by page-tables or similar mapping constructs. Such computer devices may include personal computers, personal digital assistants, hand-held devices, multiprocessor systems, microprocessor-based or programmable consumer electronics, network PCS, minicomputers, mainframe computers, and the like. The operating systems of the computer devices may be configured to limit access and modification of page map pages to provide trusted memory sections.

Although not required, the invention will be described in the general context of computer-executable instructions, such as program modules, that are executed by computer devices. Generally, program modules include routines, programs, objects, components, data structures, etc., that perform particular tasks or implement particular abstract data types. In distributed computing systems, tasks may be performed by remote computer devices that are linked through a communications network. In a distributed computing environment, program modules may be located in both local and remote memory storage devices.

Figure 1:
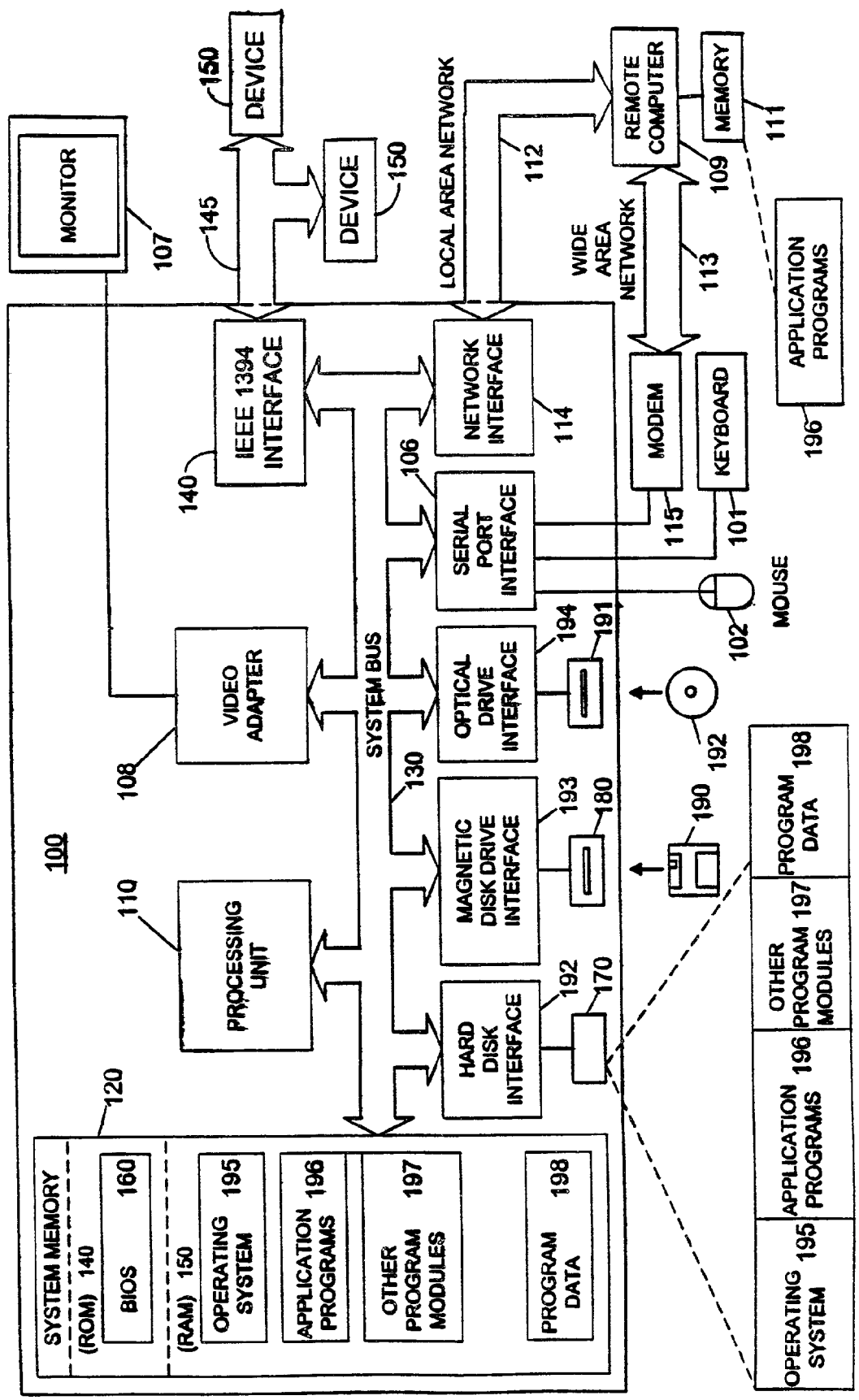
FIG. 1 is a block diagram of a general-purpose computer system capable of being used in conjunction with the present invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during startup, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port, a universal serial bus (USB) or through a PCI board. A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other ways of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 2:
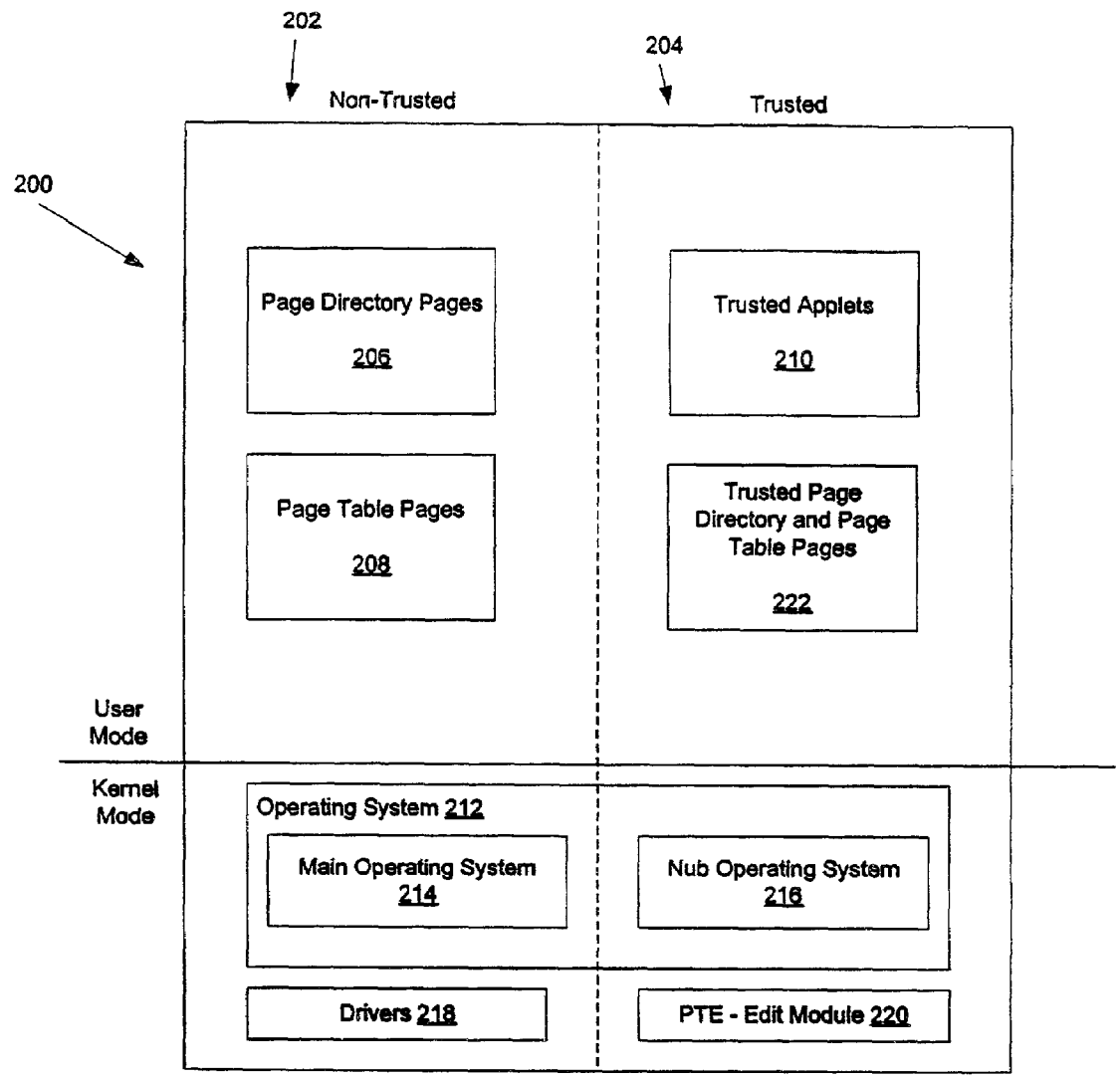
FIG. 2 illustrates a memory module partitioned into trusted and non-trusted sections in accordance with an embodiment of the invention.

FIG. 2 illustrates a memory module 200 partitioned in accordance with an embodiment of the invention. Memory module 200 is divided into a trusted section 202 and a non-trusted section 204. Memory module 200 is also divided into a user mode memory section and a kernel mode memory section. Page directory pages 206 and page table pages 208 may be stored in a read only section of non-trusted user mode memory. Page directory pages 206 and page table pages 208 may be used to map a virtual address to a physical memory page in the manner described below. One skilled in the art will appreciate that the present invention is not limited to embodiments that include both page directory pages and page table pages. As used herein, a "page map page" may include a page directory page, a page table page or any other data structure used to map a virtual address to a physical memory page.

The trusted user mode section of memory 200 may contain trusted applets 210. In one aspect of the invention, trusted applets 210 include program modules for presenting audio, visual or other content to users. Trusted applets 210 may be configured to limit the user's ability to distribute and/or copy the delivered content. One or more trusted applets 210 may be executed when a user of the computer device views or otherwise utilizes content that a content owner has configured to operate with the trusted applets. For example, a trusted applet may be a media player or an e-commerce application. In fact, trusted applets have a vast array of uses, basically any time one party wants to have confidence in what a different party did or not do with some data, be media, a document etc. They also allow for the enforcement of distributed rules systems.

An operating system 212 is stored in the kernel mode memory section of memory 200. Operating system 212 is divided into a main operating system 214 stored in non-trusted kernel mode memory and a nub operating system 216 stored in trusted kernel mode memory. Main operating system 214 may be configured to control the operation of software and hardware components in a conventional manner. Main operating system 214 has access to content stored in non-trusted memory section 202, but not to the trusted memory, 204. Nub operating system 216 may be a fully featured operating system, supporting memory, processes, threads, 10, and other common OS services, or may be a trusted security kernel providing a minimum set of services necessary to host simple applications or "trusted agents," and using main operating system 214 and its devices and drivers for all non-security sensitive actions. Nub operating system 216 may access content stored in non-trusted memory section 202 and trusted memory section 204. In one implementation, nub operating system 216 can be started and stopped and be invoked several different times. For example, nub operating system 216 could be started as part of a boot operation, unloaded, and then started again to do ongoing restricted-access work.

Nub operating system 216 provides mechanisms to establish and maintain its security environment. Initial establishment of a security environment may utilize hardware assistance. The hardware may ensure that nub operating system 216 initialization code executes to completion without possible subversion by prior code executing on the machine, other processes, or other devices that have been programmed by an adversary.

Nub operating system 216 may include nub initialization code. Nub initialization code may use the platform security features to protect itself from potentially adversarial behavior of the main operating system, its devices, drivers, or applications. This may include configuring the chipset to deny DMA writes to any protected memory, and performing certain actions before transferring control back to the main operating system. Part of these actions may be to validate the page-map of the processor that will run when main operating system 214 is next scheduled to run.

Nub operating system 216 may also perform many conventional operating system functions. This may include establishing exception-handlers to process externally generated interrupts, and internally generated exceptions. Nub operating system 216 may also provide services to construct threads and processes, usually following instructions from main operating system 214. Moreover, nub operating system 216 may provide processes with a more trusted address space than a conventional operating system. For example, nub operating system 216 may be configured to not be debuggable by adversarial code. Cryptographic services may be provided by nub operating system 216 to its processes that allow nub operating system processes to keep secrets from adversarial code, and authenticate itself to remote parties.

In one embodiment of the invention, following nub operating system 216 initialization, the processor can switch backwards and forwards between normal and protected mode under the control of software. Nub operating system 216 can at any time relinquish trusted mode by issuing a suitable processor instruction. Typically, nub operating system 216 will save any register or other state that is considered sensitive to protected memory before initiating such a transition.

Similarly, in one embodiment, any suitably privileged code running in main operating system 214 can initiate a context switch into trusted mode; however, the platform will ensure that execution of nub operating system 216 always begins at a code location (or one of the code locations) of the choosing of nub operating system 216, and may ensure that no prior execution state, beyond that passed explicitly or implicitly as parameters, can effect the execution of nub operating system 216.

One skilled in the art will appreciate that additional software modules may also be stored in user mode memory and kernel mode memory. For example, drivers 218 may be stored in non-trusted kernel mode memory. A page table entry edit module 220 is stored in trusted kernel mode memory to control edits to page map pages. Page table entry edit module 220 may validate, add to and modify entries in page directory pages 206 and page table pages 208 when the computer device is operated in a trusted mode. In one implementation, a single page table entry edit module 220 may provide more than one trusted memory section to allow more than one nub operating system 216 to run at a time.

Figure 3:
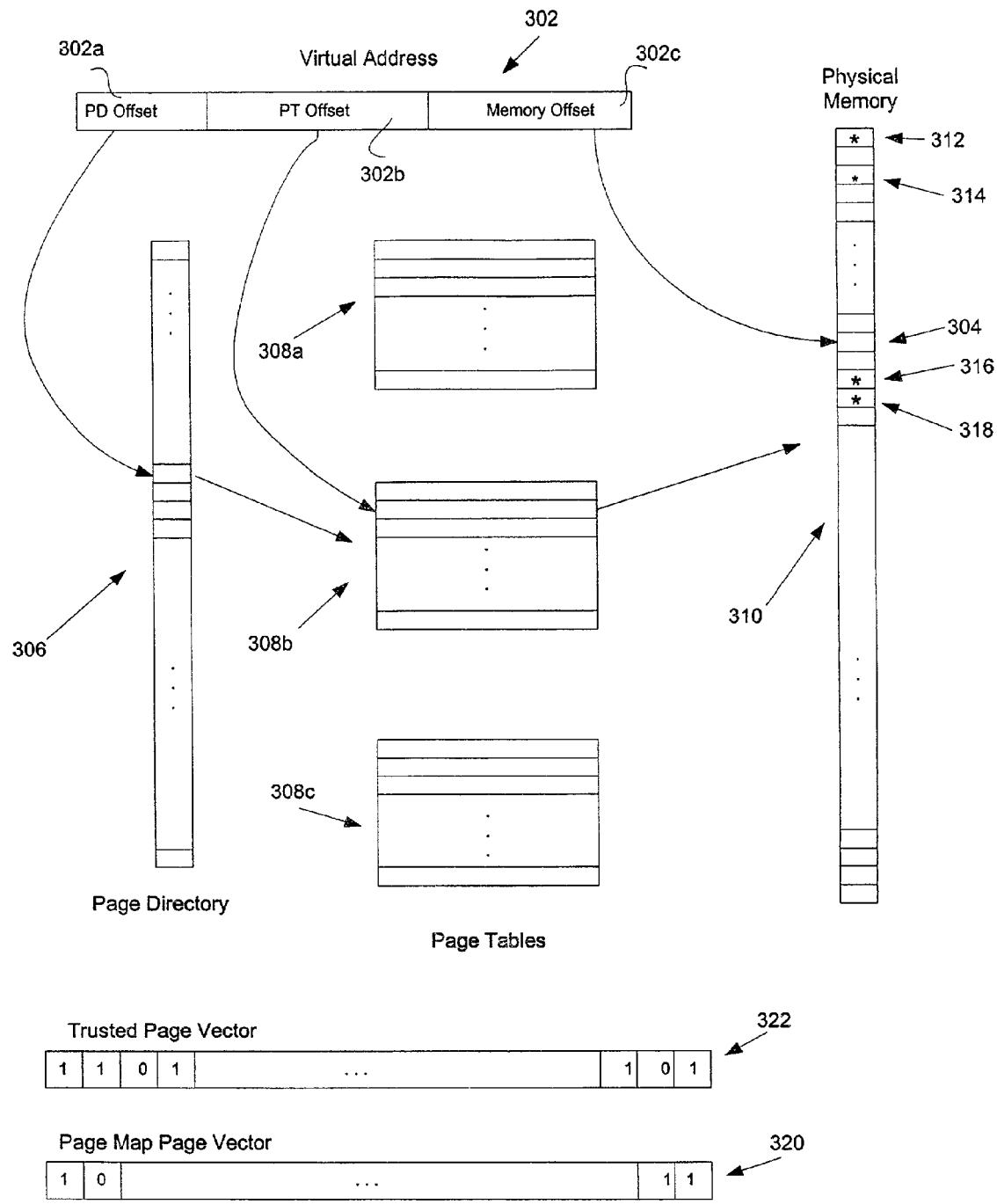
FIG. 3 illustrates the mapping of a virtual address to a corresponding physical memory page.

FIG. 3 illustrates the mapping of a virtual address 302 to a corresponding physical memory page 304. The conventional mapping of virtual addresses to physical memory pages is described in detail in many publicly available CPU manuals. The mapping uses a page directory page 306 and page table pages 308a–308c to locate page 304 of physical memory 310. Virtual address 302 includes a page directory offset value 302a, a page table offset value 302b and a memory offset value 302c. Page directory offset value 302a points to an entry in page directory page 306. The entry in page directory page 306 points to page table page 308b. Page table offset 302c points to a specific entry in page table page 308. Page table page 308b points to a physical memory page 310. Memory offset 302c points to page 304 within physical memory 310.

When an operating system is operated in a page-mapping mode, a software or hardware component must utilize page map pages, such as page directory 306 and/or page tables 308a–308c, to locate pages of physical memory 310. Memory 310 includes trusted sections 312, 314, 316 and 318, each marked with an asterisk for illustration purposes. Page directory page 306 and page table pages 308a–308b do not contain entries pointing to trusted memory sections 312, 314, 316 and 318. Therefore, hardware and software modules cannot utilize page directory 306 and/or page tables 308a–308c to locate and modify the contents of trusted memory pages.

Page directory page 306 and page table pages 308a–308c may be configured to prevent mapping of trusted memory sections 312, 314, 316 and 318 by storing the content of page directory page 306 and page table pages 308a–308c in read-only format when the computer device is operating in a non-trusted mode. An unauthorized attempt to write data may result in the declaration of an error or fault condition. In one implementation, when such a fault-condition occurs, the processor or software must initiate a context switch into PTE-edit control module 220 running in trusted mode where the edit or addition is examined by PTE-edit control module 220, and allowed, disallowed (resulting in an unrecoverable error condition), or modified. Edits and additions to page directory 306 and page tables 308a–308c are controlled by PTE-edit control module 220 stored in trusted memory section 204. As a result, edits and additions to page directory 306 and page tables 308a–308c can only be made when the computer device is operated in a trusted mode.

The precise behavior of PTE-edit control module 220 may depend on the characteristics of the physical page that is being mapped or being removed from the map. In the case that the properties of the page are being modified (for example, if a page is being switched from read-write to read-only) PTE-edit control module 220 may be configured to behave differently depending on the characteristics of the physical page being referenced. A page map page vector 320 (PMV) indicates whether or not memory pages are page map pages (page directories, page tables, or other paging structures for more complicated mapping architectures). As used herein, a "vector" is a representation of "sets", and may be implemented with a bit vector, list of integers, list of addresses, or any other arbitrary representation of a set. A bit value of 1 may indicate that a page is a page map page. Page map vector 320 may be large enough to contain a bit value for every memory page and may be used by software or hardware to identify and limit access to page map pages, or be used by PTE-edit control module 220 to determine its actions in response to page edit-requests by main operating system 214.

A subset of page map vector 320 is those pages that are allowed as page-map roots. Page map roots are often called page directories. A root page vector, or RPV indicates these pages. In one aspect of the invention, pages identified as allowed root-pages are always included in page map page vector 320. PTE-edit control module 220 may arrange that all mappings to pages in page map page vector 320 are read-only when accessed by main operating system 214 or its applications. A read-only mapping ensures that untrusted code cannot directly change mapping data without the actions being validated, filtered, or modified, by PTE-edit control module 220.

A trusted page vector 322 may store access values indicating whether or not memory pages are trusted or restricted. For example, a bit value of 1 may indicate that a memory page is trusted and a bit value of 0 may indicate that a memory page is non-trusted. A trusted page is inaccessible if the processor is not in trusted mode. Nub operating system 216 may identify memory that is for its exclusive use with membership in trusted page vector 322. In one embodiment, PTE-edit control module 220 marks all pages that contain the PTE-EC data tables as members of trusted page vector 322. Trusted page vector 322 may also cover itself, i.e., contain an access value indicating that trusted page vector 322 is trusted.

Figure 4:
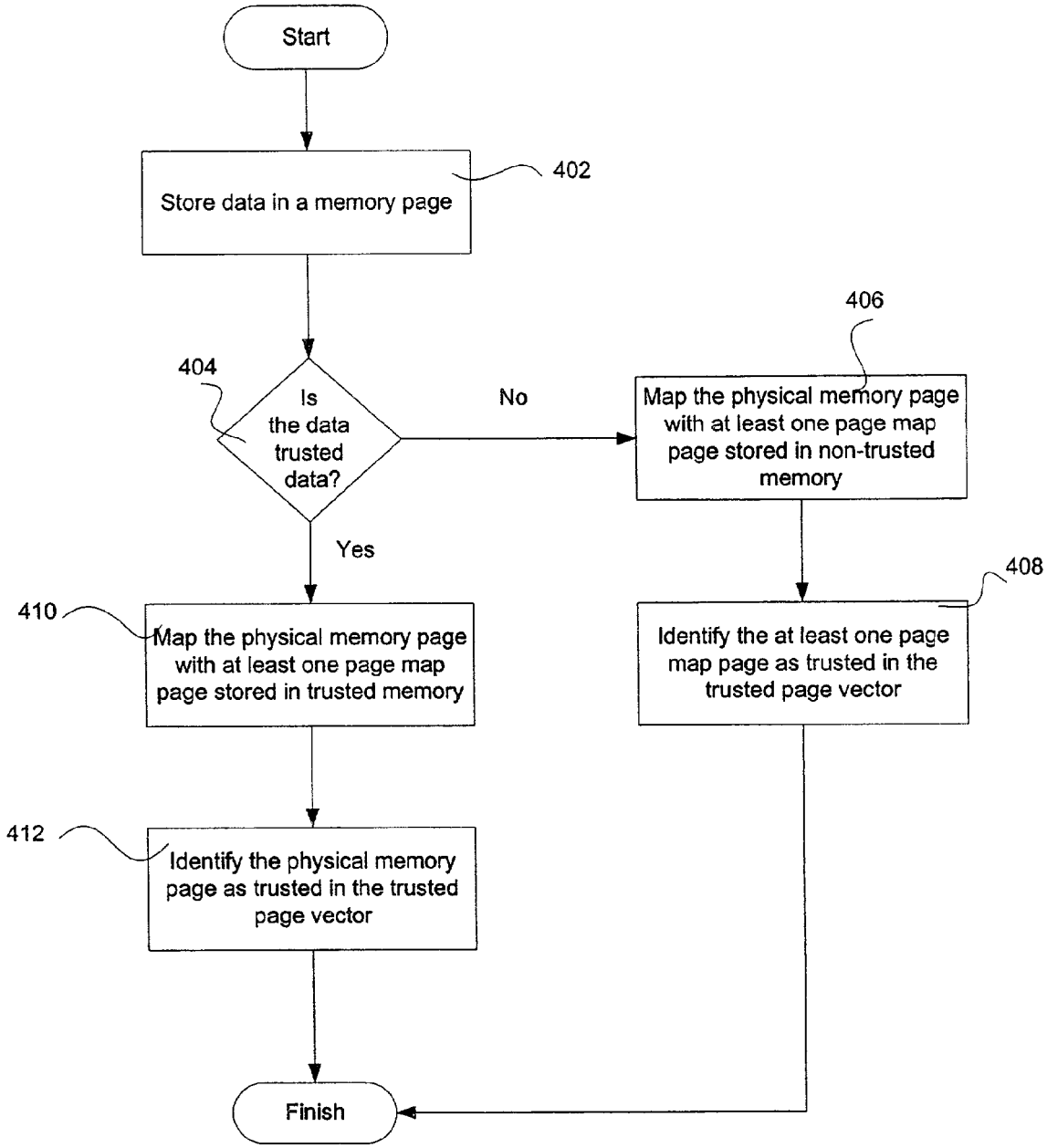
FIG. 4 illustrates a method of storing data in accordance with an embodiment of the invention.

FIG. 4 illustrates a method of storing data in accordance with an embodiment of the invention. First, in step 402, data is stored in a memory page. The memory page may be physical memory page 310 shown in FIG. 3. Next, in step 404, it is determined whether the data is trusted data. Data may be identified as trusted data by nub operating system 216. When the data is not trusted data, in step 406, the physical memory page is mapped with at least one page map page stored in non-trusted memory. Next, in step 408 the at least one page map page is identified as trusted in trusted page vector 320. When the data is identified as trusted data, in step 410, the physical memory page is mapped with at least one page map page stored in trusted memory, such as trusted pages 222 shown in FIG. 2. Next, in step 412, the physical memory page is identified as trusted in a trusted page vector. If the data is identified as protected by nub operating system 216, there exists no mapping that can be used by the main operating system to this data page. PTE-edit control module 220 may ensure that there is never a read or write mapping to the trusted page that can be used by main operating system 214. In one embodiment of the invention, nub operating system 216 has its own mappings exclusively for nub operating system 216, and for the trusted processes that nub operating system 216 hosts.

Figure 5:
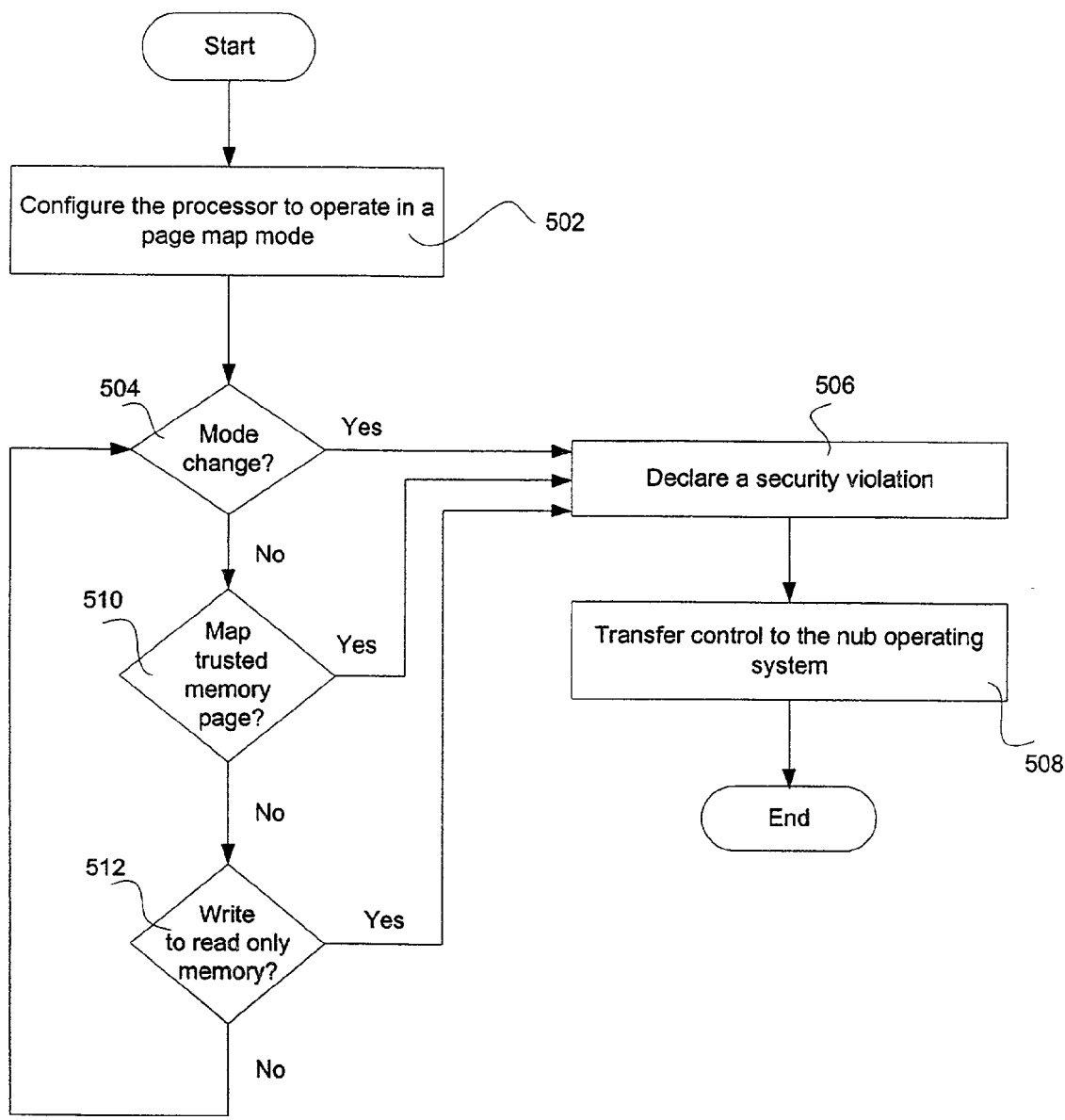
FIG. 5 illustrates a method of controlling access to trusted memory pages in accordance with an embodiment of the invention.

FIG. 5 illustrates a method of controlling access to trusted memory pages in accordance with an embodiment of the invention. First, in step 502, a processor is configured to operate in a page-mapping mode. While in the page-mapping mode, access to memory will be limited by controlling entries that will be included in the page map pages. In "multi-mode" machines (e.g. the x86) the machine may be locked into one mode that works with nub operating system 216. For example, on a 64 bit x86 machine, the machine may be locked into 64 bit mode. Or, the machine may be locked into 16 bit segment map mode and a segment map edit control nub operating system may be utilized. In step 504, it is determined whether or not there is an attempt to change the mode of operation of the processor to a mode in which the protections afforded by the page-mapping are bypassed. In particular, it may be determined whether or not there is an attempt to change the processor out of page-mapping or segment-mapping mode. When there is an attempt to change the mode of the processor, in step 506 a security violation is declared. Next, in step 508, the security violation causes a context switch into nub operating system 216 for further processing. One skilled in the art will appreciate that a security violation does not have to cause a context switch into nub operating system 216. For example, a write to a read-only page or the load of cr3 can just fault normally to some normal space fault handler, so long as the write or cr3 load does not actually occur. In one aspect of the invention, when a security violation is declared, nub operating system 216 treats the action as adversarial, or potentially adversarial, and clears all data from protected pages, and cause a blue screen or other audio or visual signal indicating a fatal error to be presented to the user.

When there is no attempt to change the mode of the processor, in step 510 it is determined whether or not there has been an attempt to map a trusted memory page. An attempt to map a trusted memory page will necessitate adding page map page entries that point to a trusted memory page. Since the page tables are maintained read-only by PTE-edit control module 220, the edits necessary to map a new page result in a "write to read-only page" fault by the main processor. When such actions occur, the main processor or main operating system 214 may transfer control to PTE-edit control module 220, which will examine the attempted write and allow it, modify it, or disallow it, based on the knowledge of the target page derived from its membership in trusted page vector 322, page map page vector 320 or the root page vector. If the target page is a member of trusted page vector 322, then the PTE-EC module may treat this action as adversarial, and clean all private state, and abort. PTE-edit control module 220 should edit the target page table entry to ensure that the mapping is read-only. This action ensures that all further attempts by the main OS to edit page tables always result in a "write to read-only page" fault, and ensures the continued integrity of the protection mappings.

If the target page is a normal page (not a member of trusted page vector 322 or the root page vector) then the write should be allowed without modification. In one embodiment, if the target page is not a member of trusted page vector 322, then PTE-edit control module 220 takes no action, but schedules main operating system 214 to handle the fault (this case indicates other uses for read-only pages).

PTE-edit control module 220 may also be invoked on writes to page tables that are made by main operating system 214 with the purpose of removing pages from the page map. These actions will not affect the integrity of the system and so can be allowed. However, PTE-edit control module 220 may include computer executable instructions to examine these actions in order to maintain the correctness of page map page vector 320. For example, an edit to a page directory that removes a link to a page table may indicate that the target page can be removed from trusted page vector 322, if there are no other links to this particular page.

PTE-edit control module 220 may also be invoked whenever a new page map is loaded by the processor. The first time a particular page map is used, PTE-edit control module 220 may recursively descend the page directory, and page tables to ensure that all mappings maintain the necessary invariant. To perform this, PTE-edit control module 220 may ensure that there is no mapping to a trusted page. If there is, then the mapping may be treated as a fatal error. If the page map provides read-write mappings to any page in page map page vector 320, then the mapping is made read-only. The pages that comprise the page map are added to trusted page vector 322. Furthermore, DMA exclusion vector 610 may be updated to protect the new pages added to trusted page vector 322. Finally, the page directory is added to the root page vector. Once these actions have been performed, main operating system 214 can be re-scheduled using the new page map.

In normal operation, processes are re-scheduled frequently. Once a page map has been checked according to the procedures just described and the root page has been added to the root page vector, subsequent attempts to load this page-map can occur without further checking. PTE-edit control module 220 may also be notified whenever a page map is no longer in use. This will typically be a consequence of a process being destroyed. When this happens, PTE-edit control module 220 recursively removes all page tables from trusted page vector 322 and the root from DMA exclusion vector 610.

PTE-edit control module 220 may also be invoked to add pages to the trusted page set, or remove pages from the trusted page set. These actions may be performed at the behest of the main operating system 214 or nub operating system 216. If a page is removed from the trusted page set, nub operating system 216 ensures that the page is actually a member of trusted page vector 322, clear it of any private data, and remove it from the trusted page vector 322 and a DMA exclusion vector 610 (shown in FIG. 6 and described below). If a page is added to the trusted page set, nub operating system 216 ensures that the page is not a member of trusted page vector 322 or page map page vector 320 and then adds it to trusted page vector 322 and DMA exclusion vector 610. Next, in step 512 it is determined whether there has been an attempt to write to a read-only memory in a page map page. Step 512 may include comparing the identification of a memory page to the values included in page map page vector 320. When there has been such an attempt, in step 506 a security violation is declared. Steps 504, 510 and 512 may be repeated several times to ensure that the integrity of the trusted memory has been maintained. One skilled in the art will appreciate that aspects of the present invention will work with any virtual-to-physical mapping scheme that utilize mapping all addresses through some mapping table.

Typical memory architectures allow other devices direct access to system memory. Such facilities are used by IO devices to perform data transfers to and from main memory. Many computer architectures allow IO devices to bypass the memory protections and rules provided by the virtual memory system, and hence read and write arbitrary physical memory. In one aspect of the invention, to prevent adversarial code from arbitrary modifications of trusted system memory, or the page tables, the memory controller or other hardware may be able to restrict access to certain pages of physical memory under the control of PTE-edit control module 220. A chipset of a memory subsystem is instructed which pages should be inaccessible to devices by setting bits in a DMA exclusion vector. If a particular page is marked as protected in the DMA exclusion vector, then no 10 device can read or write to the indicated page. The DMA exclusion vector may be under the programmatic control of PTE-edit control module 220. PTE-edit control module 220 may protect members of trusted page vector 322 by setting appropriate bits in the DMA exclusion vector. Alternative embodiments may differentiate read from write access, and yet others may protect pages on a device-by-device basis (allowing certain privileged devices access to certain otherwise protected pages). Of course, PTE-edit control module 220 may also examine all attempted read and write operations to system and respond accordingly.

Figure 6:
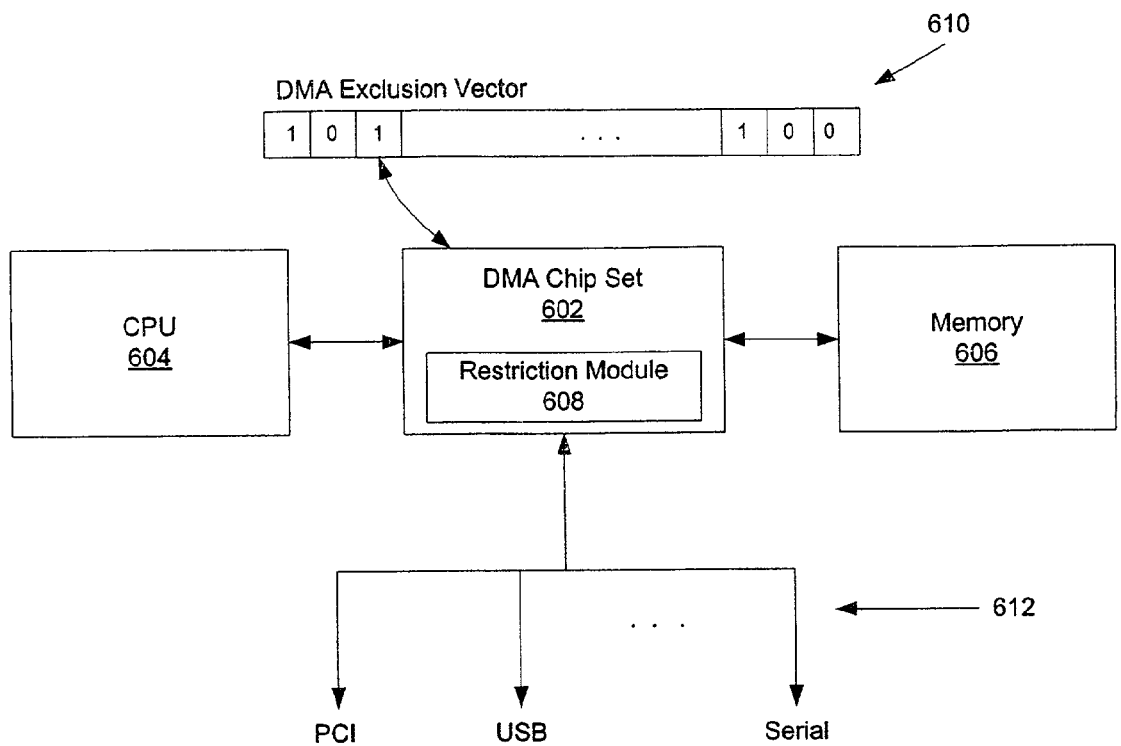
FIG. 6 illustrates a hardware configuration that may be implemented to limit direct memory access to memory modules.

FIG. 6 illustrates a hardware configuration that may be implemented to limit direct memory access (DMA) to memory modules. In FIG. 6, a DMA chipset 602 is coupled between a central processor unit 604 and a memory module 606. DMA chipset 602 includes a restriction module 608 that is configured to analyze DMA requests and read data stored in a DMA exclusion vector 610. DMA exclusion vector 610 includes access values indicating whether or not physical memory pages of memory 606 are trusted or non-trusted pages. For example, a bit value of 1 may indicate that a given physical memory page is trusted and a bit value of 0 may indicate that the physical memory page is non-trusted.

DMA chipset 602 may be coupled to one or more ports 612, each of which may be coupled to one or more physical devices that have bus master access. When a device coupled to one of ports 612 attempts to read data from or write data to a memory page of memory 606, restriction module 608 retrieves access values from DMA exclusion vector 610 and determines whether the device is authorized to read data from or write data to the memory page. When the access value allows for the reading and writing of data to the memory page, the device operates in a conventional manner. However, when the access value in DMA exclusion vector 610 identifies the physical page as trusted, an error condition is declared.

There are several implementations of aspects of the invention that can preserve trust in low power and power loss states. In one implementation, any time a trust state is lost due to a power condition or other cause, the system memory is scrubbed or reset. For example, if a suspend power state causes the chipset to lose track of DMA exclusion vector 610, on power up, the system memory may be scrubbed. If the hardware is able to keep DMA exclusion vector 610, it may scrub only those pages for which DMA exclusion vector 610 has true entries. Alternatively, if the hardware cannot keep track of DMA exclusion vector 610, it may scrub all of the system memory.

The present invention allows for a wide range of hardware optimization. For example, the root page vector may be used to decide which cr3 loads should fault or not and hardware knowledge of the root page vector, page map page vector 320, trusted page vector 322 and DMA exclusion vector 610 to decide, in the hardware, which page map edits are legal or not, and let the legal ones occur without recourse to nub operating system 216. Nub operating system 216 may be notified of edits that link or unlink a page map page and edits that map or unmap a page. The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims. For example, the present invention can be implemented using a single image multi-processor version of nub operating system 216, using multi-processor synchronization algorithms that are similar to what is used for multi-processor tlb shoot-down.

We claim:

1. A method of restricting access to memory, the method comprising:
    storing data in a memory location;
    determining whether the data is trusted or non-trusted data;
    mapping the memory location with at least one page map page stored in a non-trusted memory section only when the data is non-trusted data; and
    storing entries in the at least one page map page in read only format.

2. The method of claim 1, further including:
    declaring a security violation when an attempt is made to write data to a read only page map page entry.

3. The method of claim 2, further including:
    aborting the attempt when the attempt is not a legal operation.

4. A computer-readable medium contain computer-executable instructions for causing a computer device to perform the steps comprising:
    storing data in a memory location;
    determining whether the data is trusted or non-trusted data; and
    mapping the memory location with at least one page map page stored in a non-trusted memory section only when the data is non-trusted data, further including computer-executable instructions for causing the computer device to perform the step comprising:

configuring a processor that controls access to the at least one page map page to run in a page-mapping mode, further including computer-executable instructions for causing the computer device to perform the step comprising:
storing entries in the at least one page map page in read only format.

5. The computer-readable medium of claim 4, further including computer-executable instructions for causing the computer device to perform the step comprising:
declaring a security violation when an attempt is made to write data to a read only page map page entry.

* * * * *

UNITED STATES PATENT AND TRADEMARK OFFICE
CERTIFICATE OF CORRECTION

PATENT NO. : 6,986,006 B2
APPLICATION NO. : 10/124609
DATED : January 10, 2006
INVENTOR(S) : Bryan Mark Willman et al.

Page 1 of 1

It is certified that error appears in the above-identified patent and that said Letters Patent is hereby corrected as shown below:

In column 4, line 34, delete "10" and insert -- IO --, therefor.

In column 9, line 31, delete "10" and insert -- IO --, therefor.

Signed and Sealed this

Eighth Day of September, 2009

David J. Kappos
*Director of the United States Patent and Trademark Office*